United States Patent [19]

Lecocq et al.

[11] Patent Number: 5,046,041
[45] Date of Patent: Sep. 3, 1991

[54] DEVICE FOR TRANSMITTING INFORMATION BETWEEN A PLURALITY OF ELEMENTS OF AN AUTOMOBILE VEHICLE, AND A CENTRAL INFORMATION PROCESSING UNIT

[75] Inventors: Jean-Luc Lecocq, Sevres; Anselmo Soria-Mangano, Villepreux, both of France

[73] Assignees: Automobiles Peugeot, Paris; Automobiles Citroen, Neuilly/Seine; Regie Nationale des Usines Renault, Boulogne Billancourt, all of France

[21] Appl. No.: 284,604

[22] Filed: Dec. 15, 1988

[30] Foreign Application Priority Data

Dec. 17, 1987 [FR] France .............................. 87 17647

[51] Int. Cl.$^5$ ................................................ G06F 13/26
[52] U.S. Cl. ................................. 364/900; 364/940; 364/941; 364/941.3
[58] Field of Search ... 364/200 MS File, 900 MS File

[56] References Cited

U.S. PATENT DOCUMENTS

| | | | |
|---|---|---|---|
| 3,289,168 | 11/1966 | Walton et al. | 364/200 |
| 3,810,114 | 5/1974 | Yamada | 364/200 |
| 3,925,766 | 12/1975 | Bardotti et al. | 364/200 |
| 3,996,564 | 12/1976 | Kerrigan et al. | 364/200 |
| 4,013,875 | 3/1977 | McGlynn | 364/424.07 |
| 4,063,220 | 12/1977 | Metcalfe et al. | 340/825.5 |
| 4,271,479 | 6/1981 | Cheselka | 364/200 |
| 4,281,315 | 7/1981 | Baner | 364/200 |
| 4,493,021 | 1/1985 | Agrawal et al. | 364/200 |
| 4,507,793 | 3/1985 | Adams | 375/36 |
| 4,628,446 | 12/1986 | Hoffner | 364/200 |

FOREIGN PATENT DOCUMENTS 0117832 9/1984 European Pat. Off. .
WO80/01008 5/1980 PCT Int'l Appl. .

*Primary Examiner*—David Y. Eng
*Attorney, Agent, or Firm*—Burns, Doane, Swecker & Mathis

[57] ABSTRACT

Device in which some elements perform functions having high priority access characteristics and other elements perform functions having low priority access characteristics, wherein the central information processing unit comprises a microprocessor assembly connected to first protocol control means connected through multiplexing means to first information input-/output means connected to low priority access buses to which are connected the elements having low priority access characteristics, and the microprocessor assembly is connected to second protocol control means connected to second information input/output means connected to a high priority access bus to which are connected the elements having high priority access characteristics.

4 Claims, 1 Drawing Sheet

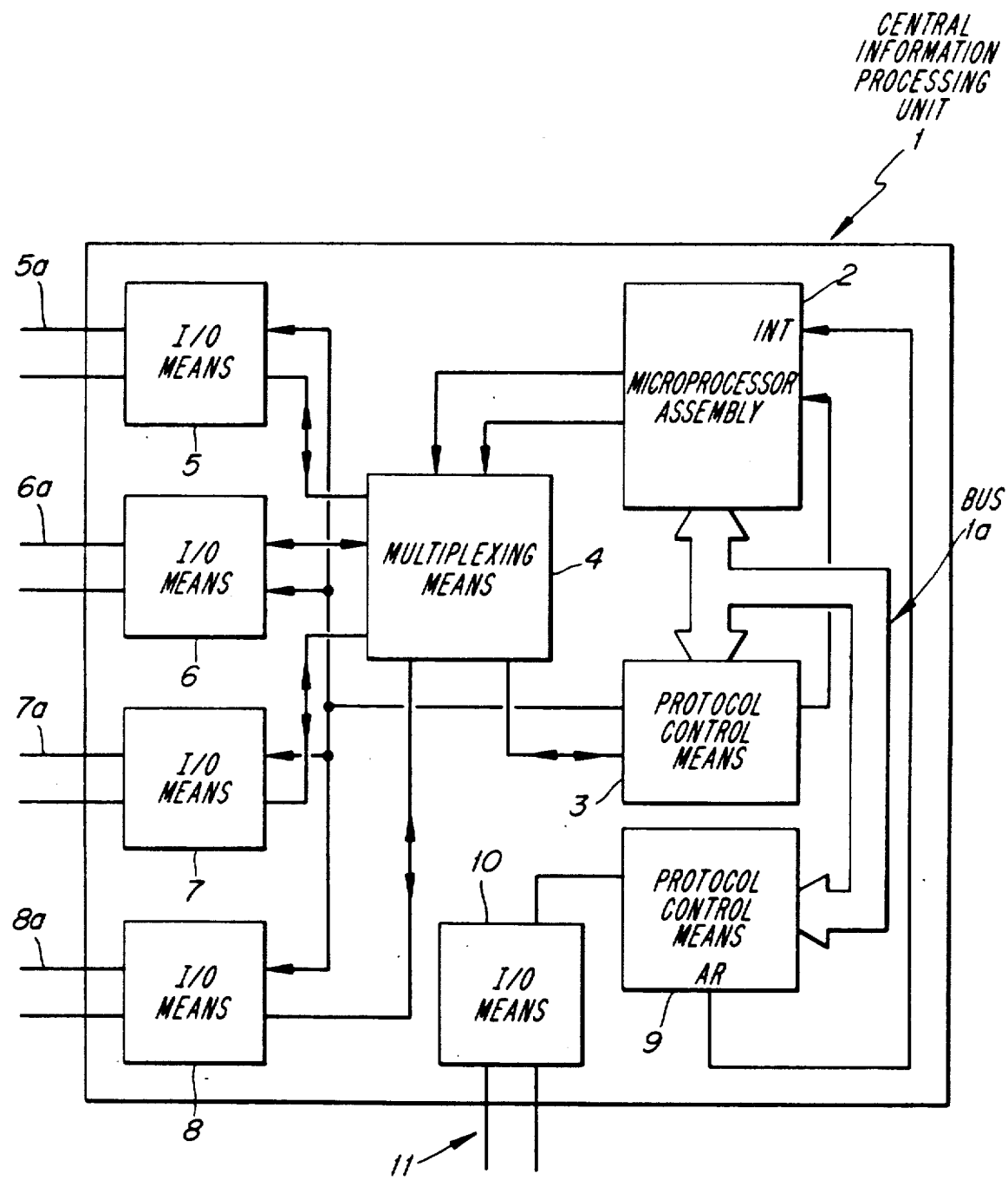

DEVICE FOR TRANSMITTING INFORMATION BETWEEN A PLURALITY OF ELEMENTS OF AN AUTOMOBILE VEHICLE, AND A CENTRAL INFORMATION PROCESSING UNIT

BACKGROUND OF THE INVENTION

1. Field of the Invention

The present invention relates to a device for transmitting information between a plurality of elements of an automobile vehicle, and a central information processing unit.

2. Background Art

A number of transmitting devices of this type are already known in the art.

Thus, for example, transmitting devices are known which comprise a central information processing unit connected to the various elements of the vehicle through one or more selective access buses, also termed bus of the polling type ensuring the transmission of the information.

The central unit effects a successive polling of all the elements, for example the control elements of the vehicle such as the elements controlling the horn, the direction-changing indicators, etc..., and in response to the controls actuates the corresponding receiving elements.

For reasons of safety of operation, it is necessary to ensure a redundancy of the transmission of the items of information between the control elements and the central unit and between the central unit and the corresponding receiving elements. There have consequently been developed information transmitting systems operating in a differential manner, these systems comprising capacitive coupling mechanisms to permit a sufficient operation of the latter even when one of the data transmission lines is disturbed.

Moreover, it is also desirable to be in a position to operate at transmission frequencies which are as low as possible so as to avoid risks of generation of electromagnetic interferences and to reduce the cost of manufacture of such systems.

These devices have a number of drawbacks, in particular as concerns the selectivity of the priorities of the control elements and therefore of the actions resulting therefrom.

Indeed, there are, in an automobile vehicle, control elements ensuring functions having high priority access characteristics, such as for example the elements controlling the brake, to which the device must immediately react for reasons of safety, and control elements such as for example elements for controlling the window glass raiser, etc... which ensure functions having a low priority access characteristic.

In the known devices, employing for example selective access information transmitting buses, all the control elements are interrogated one after the other and there is therefore no priority access to the central unit.

SUMMARY OF THE INVENTION

An object of the invention is therefore to solve these problems by proposing a device which permits separating the two types of elements and to grade the orders to perform.

The invention therefore provides a device for transmitting information between a plurality of elements of an automobile vehicle, and a central information processing unit, some elements ensuring functions having high priority access characteristics and other elements ensuring functions having low priority access characteristics, wherein the central information processing unit comprises a microprocessor assembly connected to first protocol control device which are connected through multiplexing device to first information input/output device, connected to low priority access buses to which are connected the elements having low priority access characteristics, and the microprocessor assembly is connected to second protocol control device which are connected to second input/output device connected to a high priority access bus of the collision type to which are connected the elements having high priority access characteristics, the acknowledgment output of the second protocol control device being connected to an interruption input of the microprocessor assembly to cause the latter to process in priority the information coming from the high priority access bus before effecting the processing of the information coming from the low priority access buses.

Advantageously, the low priority access buses are selective access buses which may be, in accordance with a particular embodiment, of the capacitive coupling type.

BRIEF DESCRIPTION OF THE DRAWINGS

A better understanding of the invention will be had from the following description which is given solely by way of example with reference to the accompanying drawing which is a block diagram of the device according to the invention.

DETAILED DESCRIPTION OF THE PREFERRED EMBODIMENT

As can be seen in this Figure, a device for transmitting information according to the invention between a plurality of elements (not shown) of an automobile vehicle and a central information processing unit 1, comprises a microprocessor assembly 2 connected to first protocol control device 3 through a first part of a bus 1a. These first protocol control device 3 are also connected to multiplexing device 4 which are connected to first input/output device, for example four in number and identified by the references 5, 6, 7 and 8 respectively. These information input/output device are connected to low priority access buses, for example 5a, 6a, 7a, 8a respectively, to which are connected elements of the vehicle which perform functions having low priority access characteristics, such as for example the headlights, the horn, etc.., which will also be termed hereinafter elements having low priority access characteristics.

These buses are generally relatively long and comprise a number of branch connections and connections enabling them to be connected to various elements, and the probability of failure of the data lines is therefore relatively high while the needs at the beginning of the transmission are relatively low.

For the reasons of safety mentioned before, these low priority access buses may be formed by selective access buses termed polling buses having a capacitive coupling enabling them to operate even when one of the data transmission lines is disturbed.

The use of multiplexing device 4 also permits dividing up the bus in a simple and cheap manner.

Moreover, the microprocessor assembly 2 is also connected to second protocol control device 9 through a second part of the bus 1a. These second protocol control device 9 are connected to second information input/output device 10 connected to a high priority access bus 11 to which are connected elements performing the functions of high priority access characteristics of the vehicle, such as for example the brake pedal, the centralized lighting controls, the interfaces with the anti-brake blocking systems etc... which will be termed elements having high priority access characteristics.

This bus 11 is in fact a short bus disposed in a protected zone connecting the central processing unit 1 to the dashboard of the vehicle where the needs as concerns response time are generally very short.

Furthermore, this bus is, owing to its position in the vehicle, relatively close to the antenna of the radio of the vehicle and consequently represents the worst case of pollution by electromagnetic interferences. It is therefore necessary to have very rapid access times with a low transmission frequency to satisfy these various conditions.

The acknowledgment output AR of the second protocol control device 9 is connected to an INT input of interruption of the microprocessor assembly to cause the latter to process in priority the information coming from the high priority access bus 11 before proceeding to the processing of the information coming from low priority access buses.

Thus, in conventional operation, the microprocessor assembly effects the control of the information coming from the elements having low priority access characteristics and passing through the buses 5a, 6a, 7a and 8a which is for example of the selective access type.

If an element having high priority access characteristics transmits information on the bus 11, the second protocol control device 9 transmit a signal interrupting the microprocessor assembly whose interruption control subprograms then effect the processing of the information coming from the bus 11.

Thus it will be understood that the instructions transmitted on the bus 11 by the elements having high priority access characteristics are processed in priority by the microprocessor assembly which interrupts as requested by the second protocol control device 9, the processing of information coming from low priority access buses.

Note that the rates of transmission of the information, i.e. the operating frequencies in the low priority buses and the high priority bus may be different in order to adapt this transmission to an environment, as mentioned before.

We claim:

1. A device for transmitting information comprising:
    a plurality of elements of an automobile vehicle, some of said elements performing functions having high priority characteristics and other of said elements performing functions having low priority characteristic and
    a central processing unit comprising:
        a microprocessor assembly for controlling said plurality of elements and having an interruption input for receiving an interruption signal,
        first information input/output means for passing signals to and from said elements having low priority characteristics,
        first protocol control means connected to said microprocessor assembly for conducting signals between said elements having low priority characteristics and said microprocessor assembly,
        multiplexing means connecting said first protocol control means to said first information input/output means,
        low priority buses for connecting said elements having low priority characteristics to said first information input/output means,
        second input/output means for passing signals to and from said elements having high priority characteristics,
        second protocol control means connected to said second input/output means and to said microprocessor assembly for conducting signals between said elements having high priority characteristics and said microprocessor assembly and having an acknowledgement output for outputting said interruption signal,
        a high priority bus of the collision type for connecting said elements having high priority characteristics to said second information input/output means,
        said low priority buses comprising buses adapted to operate on a given operating frequency and said high priority bus comprising a bus adapted to operate on a different operating frequency than the given operating frequency to adapt information transmission over the buses to an environment and reduce electromagnetic interferences,
        said microprocessor assembly being adapted to process in priority information coming from said high priority bus and information coming from said low priority buses, and
    wherein said acknowledgement output of said second protocol control means is connected to said interruption input of said microprocessor assembly for causing the microprocessor assembly to process in priority information coming from said high priority bus before proceeding to a processing of information coming from said low priority buses responsive to said microprocessor assembly receiving said interruption signal.

2. A device according to claim 1, wherein said low priority buses comprise selective access buses.

3. A device according to claim 1, wherein said low priority buses have a capacitive coupling.

4. A central information processing unit for transmitting information to and from a plurality of elements of an automobile vehicle some of said elements performing functions having high priority characteristics and other of said elements performing functions having low priority characteristics, said central processing unit comprising:
    a microprocessor assembly for controlling said plurality of elements having an interruption input for receiving an interruption signal,
    a first information path for transmitting information from said elements having low priority characteristics comprising:
        first protocol control means connected to said microprocessor assembly for conducting signals between said elements having low priority characteristics and said microprocessor assembly,
        first information input/output means for passing signals to and from said elements having low priority characteristics,
        multiplexing means connecting said first protocol control means to said first information input/output means, low priority buses for connecting said elements having low priority characteristics to said first information input/output means, and a second information path for transmitting information from said elements having high priority characteristics comprising:

second protocol control means connected to said second input/output means and to said microprocessor assembly for conducting signals between said elements having high priority characteristics and said microprocessor assembly and having an acknowledgement output for outputting said interruption signal, second input/output means for passing signals to and from said elements having high priority characteristics, a high priority bus of the collision type for connecting said elements having high priority characteristics to said second information input/output means, said low priority buses comprising buses adapted to operate on a given operating frequency and said high priority bus comprising a bus adapted to operate on a different operating frequency than the given operating frequency to adapt information transmission over the buses to an environment and reduce electromagnetic interferences;

said microprocessor assembly being adapted to process in priority information coming from said high priority bus and information coming from said low priority buses, and wherein said acknowledgement output of said second protocol control means is connected to said interruption input of said microprocessor assembly for causing the microprocessor assembly to process in priority order information coming from said high priority bus before proceeding to a processing of information coming from said low priority buses responsive to said microprocessor assembly receiving said interruption signal.

* * * * *